United States Patent
Hancock

(10) Patent No.: US 11,172,660 B2
(45) Date of Patent: Nov. 16, 2021

(54) SPINNER BAIT

(71) Applicant: RMB Importing, LLC, Fort Atkinson, WI (US)

(72) Inventor: Robin Hancock, Elkhorn, WI (US)

(73) Assignee: RMB Importing, LLC, Fort Atkinson, WI (US)

( * ) Notice: Subject to any disclaimer, the term of this patent is extended or adjusted under 35 U.S.C. 154(b) by 0 days.

(21) Appl. No.: 16/818,479

(22) Filed: Mar. 13, 2020

(65) Prior Publication Data

US 2021/0282381 A1    Sep. 16, 2021

(51) Int. Cl.
*A01K 85/01* (2006.01)
*A01K 85/10* (2006.01)
*A01K 85/02* (2006.01)

(52) U.S. Cl.
CPC .............. *A01K 85/01* (2013.01); *A01K 85/10* (2013.01); *A01K 85/02* (2013.01)

(58) Field of Classification Search
CPC ........ A01K 85/00; A01K 85/01; A01K 85/10; A01K 85/12
USPC .......................... 43/42.19, 42.2, 42.21, 42.31
See application file for complete search history.

(56) References Cited

U.S. PATENT DOCUMENTS

| | | | | |
|---|---|---|---|---|
| 676,521 A * | 6/1901 | Weiss | ...................... | A01K 85/10 43/42.19 |
| 923,854 A * | 6/1909 | Kenyon | ................. | A01K 85/16 43/42.02 |
| 1,155,883 A | 10/1915 | Burkman | | |
| 1,353,779 A * | 9/1920 | Moore | ..................... | A01K 85/10 43/42.19 |
| 1,467,116 A * | 9/1923 | Reekers | ................. | A01K 85/10 43/42.19 |
| 1,530,343 A * | 3/1925 | Bayer | ..................... | A01K 85/12 43/42.2 |
| 1,538,658 A * | 5/1925 | Rindt | ..................... | A01K 85/16 43/42.02 |
| 1,867,458 A | 7/1932 | Keuper | | |
| 1,916,582 A * | 7/1933 | Pflueger | ................. | A01K 85/16 43/42.19 |
| 1,967,089 A * | 7/1934 | Hick | ...................... | A01K 85/12 43/42.19 |
| 2,142,267 A * | 1/1939 | Freeman | ................ | A01K 91/04 24/601.8 |

(Continued)

FOREIGN PATENT DOCUMENTS

DE    4012717 A1 * 10/1991 ............. A01K 85/00
EP    0038245 A1 * 10/1981 ............. A01K 85/10

(Continued)

OTHER PUBLICATIONS

Website screenshot; https://www.booyahbaits.com/lures/spinnerbaits; Booyah Bass Fishing Spinnerbaits; Mar. 6, 2020.

(Continued)

*Primary Examiner* — Darren W Ark
(74) *Attorney, Agent, or Firm* — Shane Delsman; Godfrey & Kahn, S.C.

(57) ABSTRACT

A bait having a frame, a hook and a blade that spins when the bait is retrieved in the water. The spinning blade contacts a housing containing one or more balls. The contact causes the balls to contact each other and/or the housing to create noise and vibration to attract fish.

16 Claims, 9 Drawing Sheets

(56) References Cited

U.S. PATENT DOCUMENTS

| | | | |
|---|---|---|---|
| 2,183,816 A | 12/1939 | Lovelace | |
| 2,219,225 A * | 10/1940 | Gambill | A01K 85/10 43/42.08 |
| 2,292,517 A * | 8/1942 | Greene | A01K 85/10 43/42.39 |
| 2,295,292 A | 9/1942 | Rogers | |
| 2,486,635 A * | 11/1949 | Coats | A01K 85/10 43/4 |
| 2,518,031 A * | 8/1950 | Lane | A01K 85/12 43/42.2 |
| 2,546,772 A | 3/1951 | Neff | |
| 2,556,533 A | 6/1951 | Graaten | |
| 2,572,721 A * | 10/1951 | Hatt | A01K 85/10 43/42.19 |
| 2,594,981 A * | 4/1952 | Ohlund | A01K 85/12 43/42.46 |
| 2,597,982 A * | 5/1952 | Fitzgerald | A01K 85/16 43/42.12 |
| 2,603,024 A * | 7/1952 | Pollard | A01K 85/14 43/42.19 |
| 2,750,703 A * | 6/1956 | Puste | A01K 85/12 43/42.21 |
| 2,804,713 A * | 9/1957 | Johnson | A01K 85/12 43/42.2 |
| 2,804,714 A * | 9/1957 | Kratz | A01K 85/10 43/42.17 |
| 2,833,078 A * | 5/1958 | Peltz | A01K 85/01 43/42.31 |
| 2,853,826 A * | 9/1958 | Romeo | A01K 85/01 43/42.31 |
| 2,875,549 A | 3/1959 | O'Sullivan | |
| 2,917,859 A * | 12/1959 | Troyer | A01K 85/12 43/26.2 |
| 2,977,705 A * | 4/1961 | Busnel | A01K 85/01 43/17.1 |
| 2,994,982 A | 8/1961 | Murawski | |
| 2,999,329 A * | 9/1961 | Pankuch | A01K 85/01 43/26.2 |
| 3,000,130 A * | 9/1961 | Pankuch | A01K 85/01 43/42.17 |
| 3,104,486 A * | 9/1963 | Gressard | A01K 85/10 43/42.17 |
| 3,108,390 A | 10/1963 | Knight | |
| 3,226,875 A * | 1/1966 | Woolums | A01K 85/10 43/42.17 |
| 3,296,733 A * | 1/1967 | McLean | A01K 85/01 43/42.06 |
| 3,397,478 A * | 8/1968 | Lowes, Jr. | A01K 85/01 43/42.14 |
| 3,497,987 A | 3/1970 | Perrin | |
| 3,750,321 A | 8/1973 | McClellan | |
| 3,848,353 A * | 11/1974 | McClellan | A01K 85/01 43/42.31 |
| 3,855,722 A | 12/1974 | Moore | |
| 3,863,378 A | 2/1975 | Walker | |
| 3,881,272 A | 5/1975 | Parker | |
| 3,885,340 A * | 5/1975 | Volenec | A01K 85/16 43/42.16 |
| 3,909,974 A | 10/1975 | Kent | |
| 4,045,903 A | 9/1977 | Parker | |
| 4,123,870 A | 11/1978 | Wiskirchen | |
| 4,163,338 A * | 8/1979 | Lucarini | A01K 85/01 43/42.17 |
| 4,167,076 A | 9/1979 | Weaver | |
| 4,510,710 A * | 4/1985 | Hanna | A01K 85/00 43/42.13 |
| 4,616,440 A * | 10/1986 | Millroy | A01K 85/12 43/42.06 |
| 4,619,068 A * | 10/1986 | Wotawa | A01K 85/00 43/42.11 |
| 4,628,629 A * | 12/1986 | Rocchietta | A01K 85/10 43/42.19 |
| 4,672,768 A | 6/1987 | Pippert | |
| 4,674,224 A | 6/1987 | Williams | |
| 4,712,326 A | 12/1987 | Hoover et al. | |
| 4,745,700 A * | 5/1988 | Davis | A01K 85/00 43/42.11 |
| 4,765,085 A * | 8/1988 | Wotawa | A01K 85/00 43/42.11 |
| 4,785,569 A | 11/1988 | Thomas, Jr. | |
| 4,791,750 A | 12/1988 | Gammill | |
| 4,793,089 A * | 12/1988 | Long | A01K 85/00 43/42.13 |
| 4,807,383 A | 2/1989 | Delwiche | |
| 4,839,983 A | 6/1989 | Pippert | |
| 4,888,908 A * | 12/1989 | Morris | A01K 85/00 43/42.14 |
| 4,891,901 A * | 1/1990 | Baker, Jr. | A01K 85/00 43/42.11 |
| 4,901,470 A * | 2/1990 | Gentry | A01K 85/00 43/42.13 |
| 4,930,247 A * | 6/1990 | Dubois | A01K 85/01 43/42.31 |
| 5,024,019 A * | 6/1991 | Rust | A01K 85/01 43/42.11 |
| 5,070,639 A | 12/1991 | Pippert | |
| 5,121,568 A * | 6/1992 | Lindmeyer | A01K 85/01 43/42.31 |
| 5,201,784 A * | 4/1993 | McWilliams | A01K 85/01 43/42.11 |
| 5,331,762 A | 7/1994 | Banks | |
| 5,369,906 A | 12/1994 | Anterni | |
| 5,381,620 A | 1/1995 | Gibbs | |
| 5,400,542 A * | 3/1995 | Johnson | A01K 85/00 43/42.06 |
| 5,497,581 A * | 3/1996 | Williams | A01K 85/01 43/42.31 |
| 5,499,470 A * | 3/1996 | Reed | A01K 85/00 43/42.06 |
| 5,564,219 A | 10/1996 | Petri | |
| 5,588,246 A | 12/1996 | Hill | |
| 5,628,139 A * | 5/1997 | Rhoten | A01K 85/12 43/42.15 |
| 5,661,922 A * | 9/1997 | Bonomo | A01K 85/01 43/42.31 |
| 5,806,234 A | 9/1998 | Nichols | |
| 5,815,978 A | 10/1998 | Huddleston | |
| 5,918,405 A | 7/1999 | Marusak et al. | |
| 5,926,993 A | 7/1999 | Marusak et al. | |
| 5,926,994 A | 7/1999 | Mason et al. | |
| 5,946,847 A * | 9/1999 | North | A01K 85/01 43/42.31 |
| 5,970,647 A * | 10/1999 | Watkins | A01K 85/08 43/42.09 |
| 6,018,901 A * | 2/2000 | DuBois | A01K 85/00 43/42.13 |
| 6,061,948 A | 5/2000 | Boucek | |
| 6,155,000 A * | 12/2000 | Ravencroft | A01K 85/01 43/42.13 |
| 6,164,006 A | 12/2000 | Peterson | |
| 6,173,521 B1 * | 1/2001 | Rockhill, Jr. | A01K 85/00 43/42.13 |
| 6,176,035 B1 * | 1/2001 | Somogyi | A01K 85/12 43/42.14 |
| 6,212,818 B1 | 4/2001 | Huddleston | |
| 6,301,822 B1 * | 10/2001 | Zernov | A01K 85/01 43/42 |
| 6,360,476 B1 * | 3/2002 | Anastacio | A01K 85/01 43/42.31 |
| 6,651,376 B1 | 11/2003 | Link | |
| 6,675,526 B1 | 1/2004 | Baron | |
| 6,718,683 B2 | 4/2004 | Hawkins | |
| 6,840,001 B1 * | 1/2005 | Cox | A01K 85/01 43/42.19 |
| 6,865,842 B2 | 3/2005 | Brinkman | |
| 6,955,004 B2 * | 10/2005 | Phipps | A01K 85/01 43/42.13 |
| 7,185,457 B2 | 3/2007 | Nichols | |
| 7,234,267 B1 | 6/2007 | Konstant | |

(56) References Cited

U.S. PATENT DOCUMENTS

| | | | |
|---|---|---|---|
| 7,497,046 B1 | 3/2009 | Jefferson | |
| 7,614,178 B2 | 11/2009 | Hoyt | |
| 7,637,050 B2 | 12/2009 | Brick | |
| 7,644,533 B2 * | 1/2010 | Hair, III | A01K 85/01 43/42.31 |
| 7,827,730 B1 | 11/2010 | Jensen et al. | |
| 7,874,094 B2 * | 1/2011 | Brevig | A01K 85/12 43/42.2 |
| 8,316,576 B1 | 11/2012 | Brown | |
| 8,490,319 B2 | 7/2013 | Mancini et al. | |
| 8,601,737 B2 * | 12/2013 | Beer | A01K 85/01 43/42.31 |
| 8,910,415 B2 | 12/2014 | Farr, Jr. | |
| 9,173,385 B2 | 11/2015 | Cooper et al. | |
| 9,220,247 B2 * | 12/2015 | Goosey | A01K 85/18 |
| 9,713,321 B2 | 7/2017 | Smith et al. | |
| 10,244,741 B1 | 4/2019 | Hancock | |
| 10,575,506 B2 | 3/2020 | Hancock | |
| 2002/0189150 A1 | 12/2002 | Thorne | |
| 2005/0223620 A1 | 10/2005 | Pixton | |
| 2006/0042147 A1 | 3/2006 | Jenkins | |
| 2006/0075678 A1 | 4/2006 | Schammel et al. | |
| 2006/0260178 A1 | 11/2006 | Jones et al. | |
| 2009/0113783 A1 | 5/2009 | Hollomon | |
| 2009/0126256 A1 * | 5/2009 | Gregory | A01K 85/00 43/42.09 |
| 2009/0277071 A1 | 11/2009 | Harris, Jr. | |
| 2010/0000145 A1 | 1/2010 | Leppala | |
| 2010/0107469 A1 * | 5/2010 | Dunkerley | A01K 85/01 43/42.31 |
| 2010/0229453 A1 | 9/2010 | Cunningham | |
| 2010/0263259 A1 | 10/2010 | Cuthbert | |
| 2013/0152450 A1 | 6/2013 | Gregory et al. | |
| 2014/0325890 A1 | 11/2014 | Chennaz | |
| 2015/0082684 A1 | 3/2015 | Madala | |
| 2015/0282465 A1 | 10/2015 | Walsh et al. | |
| 2016/0113257 A1 | 4/2016 | Harrington | |
| 2016/0360737 A1 | 12/2016 | Yates et al. | |
| 2017/0000097 A1 | 1/2017 | Thomas | |
| 2017/0231208 A1 * | 8/2017 | Erickson | A01K 85/10 43/42.19 |
| 2017/0238514 A1 | 8/2017 | Hrncir | |
| 2018/0042206 A1 | 2/2018 | St John | |
| 2018/0368375 A1 * | 12/2018 | Folkersen | F21V 23/0407 |
| 2019/0008128 A1 | 1/2019 | Walsh | |
| 2019/0116770 A1 * | 4/2019 | Thompson | A01K 85/18 |
| 2020/0100482 A1 | 4/2020 | Hajjar | |
| 2020/0344984 A1 | 11/2020 | Burns | |

FOREIGN PATENT DOCUMENTS

| | | | | |
|---|---|---|---|---|
| EP | 2918167 A1 * | 9/2015 | | A01K 85/10 |
| FI | 61388 | 1/1982 | | |
| FR | 1301470 A * | 8/1962 | | A01K 85/00 |
| FR | 1511818 A * | 2/1968 | | A01K 85/00 |
| FR | 1524187 A * | 5/1968 | | A01K 85/10 |
| FR | 2059808 A5 * | 6/1971 | | A01K 85/10 |
| FR | 2305932 A1 * | 10/1976 | | A01K 85/01 |
| FR | 2335152 A1 * | 7/1977 | | A01K 85/01 |
| FR | 2455432 A1 * | 11/1980 | | A01K 85/10 |
| FR | 2563081 A1 * | 10/1985 | | A01K 85/10 |
| FR | 2602397 A1 * | 2/1988 | | A01K 85/10 |
| GB | 2087201 A * | 5/1982 | | A01K 85/10 |
| GB | 2340370 B * | 5/2003 | | |
| JP | 01112938 A * | 5/1989 | | |
| JP | 7050924 Y2 * | 11/1995 | | |
| JP | 2003210076 A * | 7/2003 | | |
| JP | 4021078 B2 * | 12/2007 | | |
| JP | 3164424 U * | 11/2010 | | |
| JP | 2011229423 A * | 11/2011 | | |
| JP | 2015039352 A * | 3/2015 | | |
| WO | WO-9730584 A1 * | 8/1997 | | A01K 85/01 |
| WO | WO-2018165506 A9 * | 11/2018 | | A01K 85/18 |

OTHER PUBLICATIONS

Webiste screenshot; https://www.yakimabait.com/products/original-rooster-tail/; Yakima Bait Company Original Rooster Tail; Mar. 6, 2020.

http://web.archive.org/web/20120109072551/http://www.basspro.com/Bass-Pro-Shops-Tourney-Rattle-Bait/product/10225063/; website screenshot for the Bass Pro Shops Tourney Rattle Bait; Jan. 9, 2012.

http://web.archive.org/web/20150923000105/http://www.fleetfarm.com/detail/southern-pro-tackle-rattle-eye-jig-orange/000000090151; website screenshot for the Southern Pro Tackle Rattle Eye Jig Orange; Sep. 23, 2015.

https://allsharktankproducts.com/shark-tank-products-sports/the-world-record-striper-company-fishing-lures-and-tackle/; website screenshot for the Fishing Lures and Tackle; May 19, 2015.

* cited by examiner

SPINNER BAIT

FIELD OF THE INVENTION

The present invention relates generally to the field of fishing. More particularly, the present invention relates to the field of baits.

BACKGROUND

Baits are used by fishing hobbyists and professionals to catch fish. Baits can be live, e.g. real fish, worms, frogs, etc. or artificial, which are made to look like or imitate live bait. Artificial baits come in a wide variety of shapes, sizes and configurations and can be relatively inexpensive. Further, artificial baits are versatile in that they can be tailored to attract a particular type of fish by changing one or more characteristics, for example, the shape or size.

One aspect of an artificial bait that can make the bait appear lifelike is the sound and/or vibrations it makes. Some prey or bait, e.g. invertebrates, sought after by fish, e.g. bass, make sounds and vibrations in the water that fish use to locate such prey. Some lures use rattles to mimic the sound and vibrations created by such prey to attract the sought-after fish.

One attempt to create a lifelike eye in the fishing industry, as seen in U.S. Pat. Nos. 10,575,506 and 10,244,741, by the inventor and owned by the owner of the present application, which are hereby incorporated herein for all purposes, was to use one or more balls in an enclosed housing. As the lure moves in the water, the ball(s) move from one side of the housing to the other creating a life-like appearance and a clicking sound as the contact each other and the ends of the housing.

It will be understood by those skilled in the art that one or more aspects of this invention can meet certain objectives, while one or more other aspects can lead to certain other objectives. Other objects, features, benefits and advantages of the present invention will be apparent in this summary and descriptions of the disclosed embodiment, and will be readily apparent to those skilled in the art. Such objects, features, benefits and advantages will be apparent from the above as taken in conjunction with the accompanying figures and all reasonable inferences to be drawn therefrom.

DETAILED DESCRIPTION

Figure 1:
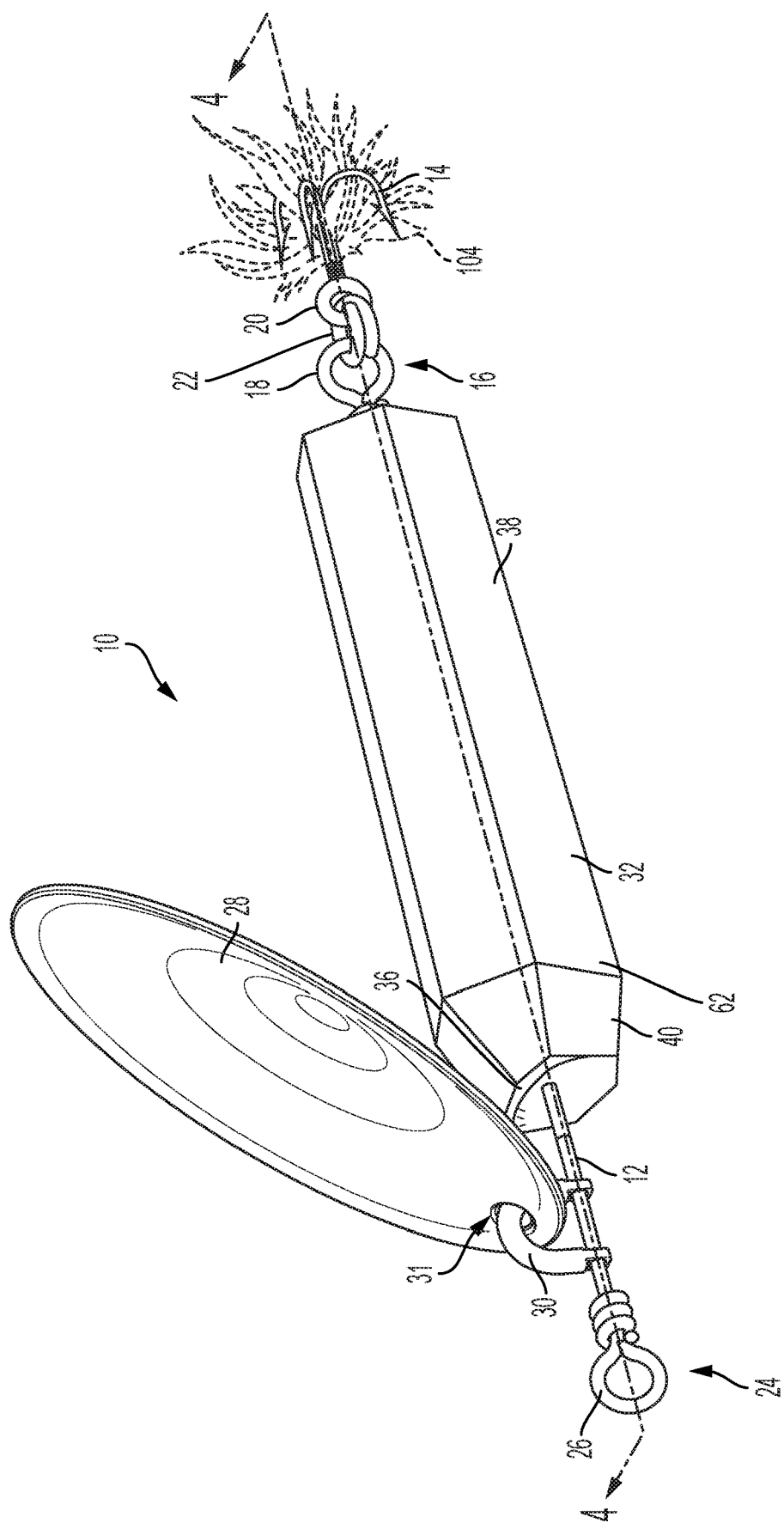
FIG. 1 is a side perspective view of one embodiment of a bait.
Figure 2:
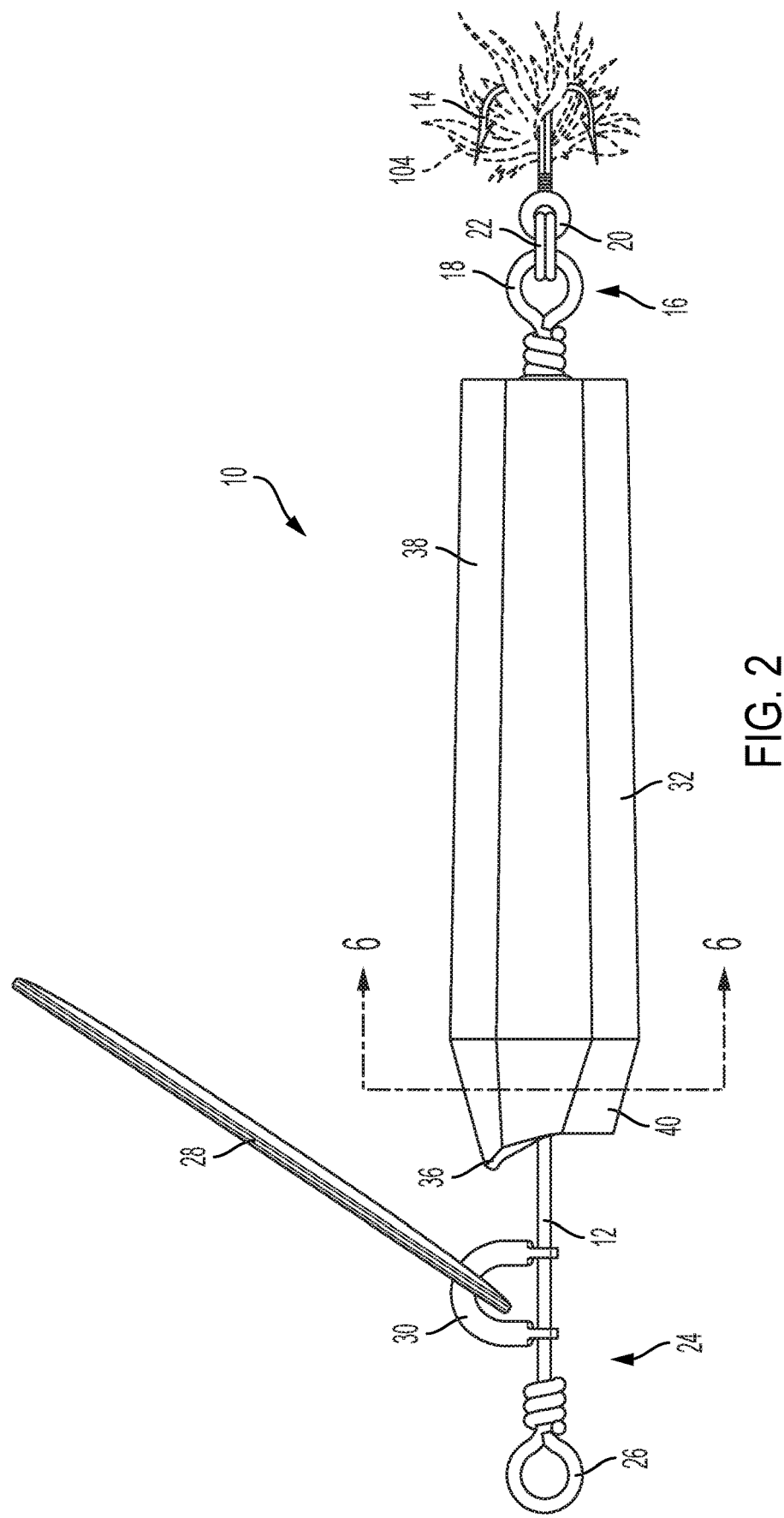
FIG. 2 is a side elevation view of the bait in FIG. 1.
Figure 3:
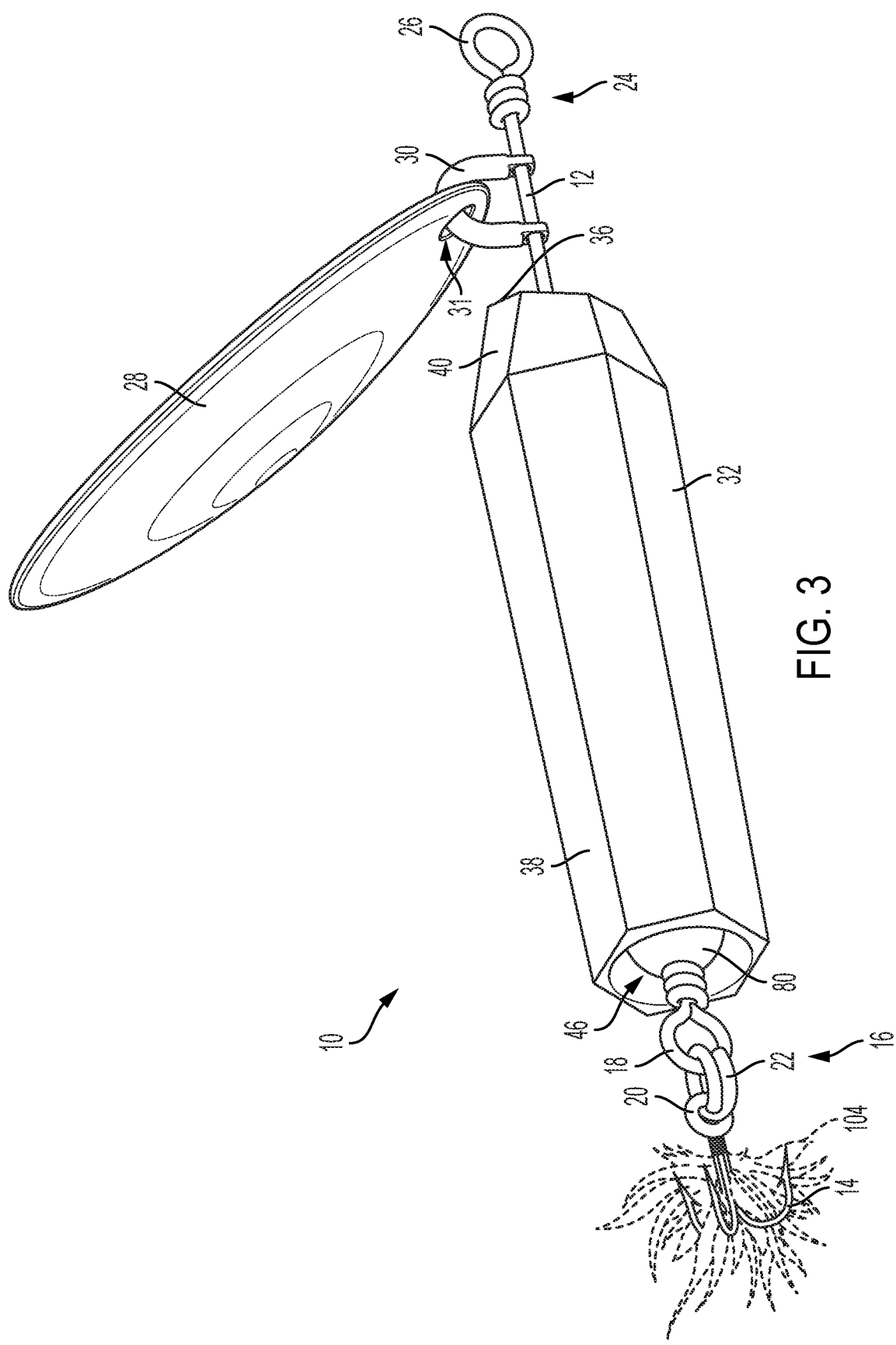
FIG. 3 is a side perspective view of the bait in FIG. 1.

As shown in FIGS. 1-6, an artificial fishing bait 10, for example a spinner bait, includes a frame, e.g. wire 12. A hook 14 can be attached or connected to the end of the first end 16 of the frame 12, such as to a loop 18 formed in the wire frame. In FIG. 1, the hook 14 has an eyelet 20 that is attached to split ring 22 which is attached to the loop 18. The second end 24 of the wire frame 12 may also include a loop or line tie 26, or have a loop connected thereto, for attaching the bait 10 to a fishing line.

A blade 28 may be attached or connected to the wire frame 12 and is configured to spin or rotate. In the embodiment seen in FIG. 1, the blade 28 is attached or connected to the wire frame 12 by a fastener 30, such as an accelerator or clevis, between the housing 32 and loop 26. The clevis 30 has a 'U' shape with two ends similar to that of a horseshoe. Each end of the clevis has a hole formed therein through which the wire frame 12 extends and which permits the clevis to rotate or spin around the wire frame 12. In the embodiment seen in FIG. 1, the blade 28 has a hole 31 formed therein. The clevis 30 extends through the hole 31 to attach the blade 28 to the wire frame 12. The curvature, size and shape of the blade 28 can also affect the spin of the blade. The spinning of the blade 28 creates vibrations and reflects light, e.g. flashing, in the water and helps attract fish.

There are many sizes and shapes to blades that can be used with baits. As the bait 10 is reeled in, the blade will spin or revolve around the wire frame 12. The different sizes and shapes of the blade enables them to revolve at different speeds. For example, a smaller, more circular blade, sometimes referred to as a Colorado blade, can be retrieved at a slower rate because it will spin more easily. A larger, more oval blade, sometimes referred to as a willow leaf, is retrieved at a faster rate to cause it to spin. A blade sometimes called the Indiana blade is in between a willow leaf and Colorado shape being more tear drop shaped. In the embodiment seen in FIG. 1, the blade 28 is a wider body blade with a blunted free end and spoon to catch the water.

A housing or casing 32 is attached or connected to the wire frame 12 adjacent to the blade 28, and in one embodiment behind the blade. The housing 32 may be attached to the frame 12 such that the housing can spin around the frame. In the embodiment seen in FIG. 4, at least one ball or noise making element 34, and in one embodiment six balls, are located within the housing 32. In one embodiment, the housing 32 is formed from an acrylonitrile butadiene styrene material and the balls are formed from a brass material. However, the housing 32 and/or balls 34 can be formed from a number of materials known in the industry, e.g. polyvinylchloride and other plastics, brass and other metals, tungsten, glass, etc., depending on the desired characteristics, including noise and/or vibration making, weight, cost, etc. The housing 32, or a portion of the housing containing the balls 34, could also be made from a material that permits light through the material or is otherwise clear or translucent to permit the moving balls to be seen by fish.

The housing 32 also has a cam or projection 36 such that as the blade 28 rotates around the wire frame 12, the blade 28, or in the embodiment shown, the clevis 30 will contact the cam 36. The contact will cause the housing 32 to move and/or rotate which in turn causes the ball(s) 34 to move and/or promotes the ball(s) to continue to move. The movement of the balls 34 against one another and/or the housing 32 causes them to make noise and/or vibrations. The noise and vibrations help to attract fish.

Figure 4:
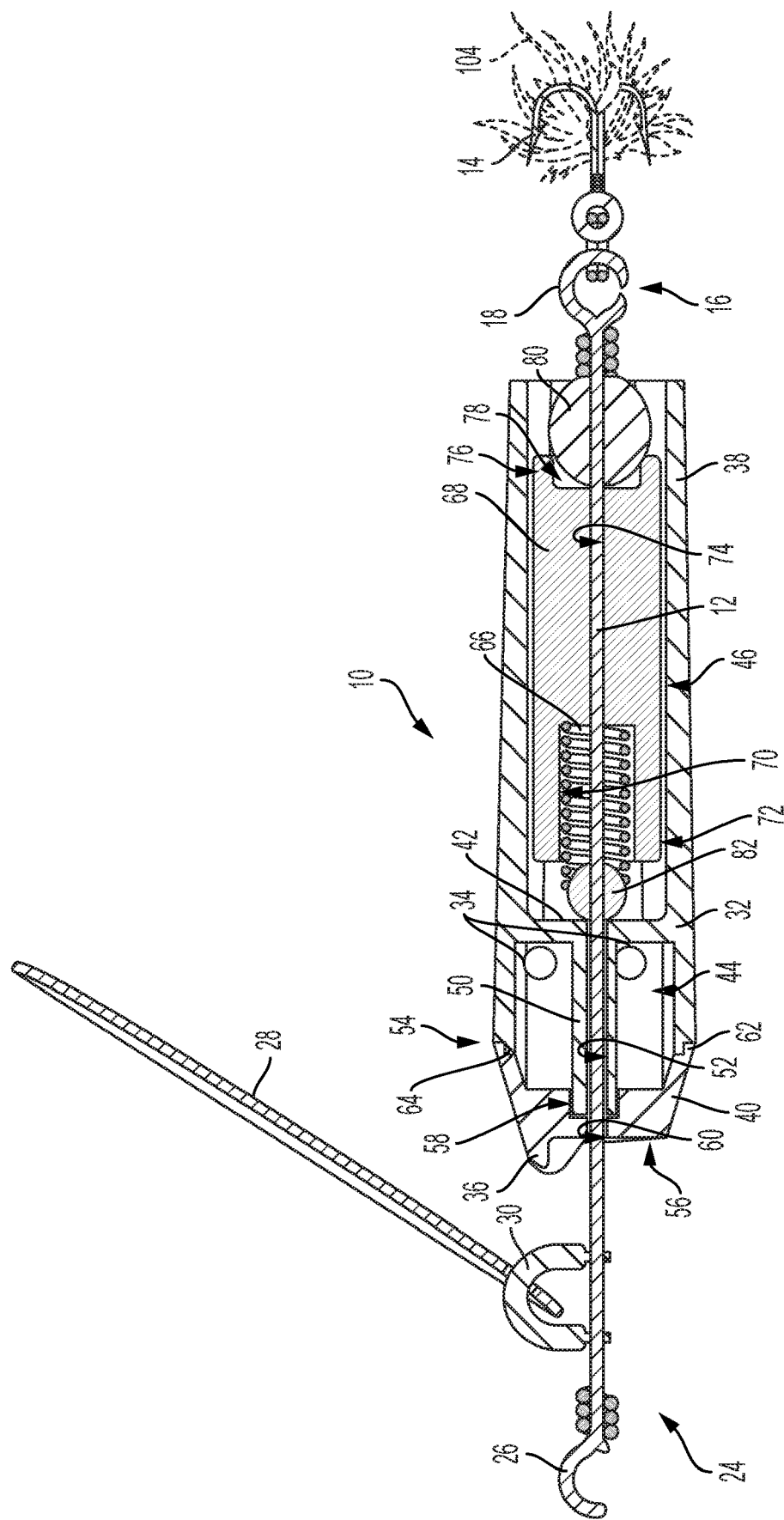
FIG. 4 is a side cross-sectional view of the bait in FIG. 1 taken from the line 4-4.
Figure 5:
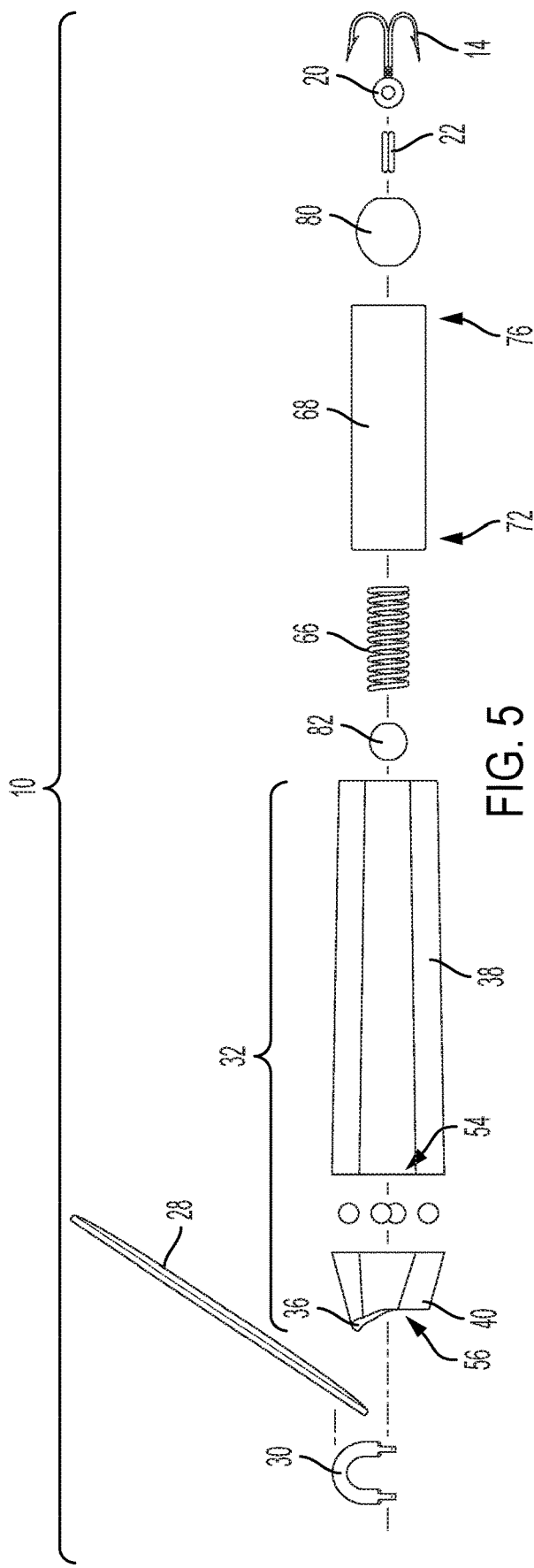
FIG. 5 is an exploded view of the bait without the skirt or frame.
Figure 6:
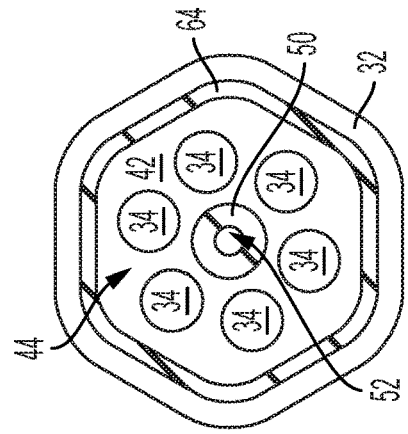
FIG. 6 is a side cross-sectional view of the bait of FIG. 2 taken along the line 6-6.

In the embodiment seen in FIG. 4, the housing 32 has a first or capsule portion 38 and a second or cap portion or lid 40. The capsule portion 38 is generally hollow with an internal wall 42 forming two cavities inside, a front cavity 44 and a rear cavity 46.

The front cavity 44 can have a post 50 extending from the wall 42 and a bore or hole 52 formed in the post and the wall to permit the wire frame 12 to extend through the housing 32 and front cavity.

The cap portion 40 has an open end 54 and a closed end 56. A blind bore 58 is formed in the closed end 56 configured to receive the end of the post 50 of the front cavity 44. A counterbore or hole 60 extends from the blind bore 58 through the closed end 56 of the cap portion 40 that matches the bore 52 to permit the wire frame 12 to extend through the cap portion. The cap portion 40 has a first lip 62 around the edge of the open end 54 that matches and mates with a second lip 64 around the edge of the front cavity 44 of the capsule portion 38. When the cap portion 40 is attached to the capsule portion 38, the front cavity 44 is enclosed and the ball(s) 34 are held within the front cavity.

The cap portion 40 can be affixed to the capsule portion 38 to prevent water from entering the front cavity 44, which would limit or prohibit the ball(s) 34 from making as much or any noise and/or vibrations. In one embodiment the cap portion 40 is ultrasonically welded to the capsule portion 38, however, other methods of attaching two portions together are known in the industry, including, gluing, friction welding, integrally forming, threading, etc., the use of which would not defeat the spirit of the invention. In the embodiment seen in FIG. 2, the lips 62, 64 bond together as does the post 50 and the portion of the closed end 56 forming the blind bore 58, while the bore 52 and counterbore 60 permit the wire frame 12 to extend through the front cavity 44 and cap portion 40.

The wire frame 12 continues and extends through the rear cavity 46. A resilient member 66 is located on the wire frame 12 to create more movement of the housing 32 and, thereby, the ball(s) 34 to create more noise and vibrations. In FIG. 4, the resilient member 66 is a spring connected to the wire frame 12 by being positioned around the wire frame in the rear cavity 46. Other resilient members are known in the industry, e.g. compressible plastic or rubber, a damper, etc., the use of which would not defeat the spirit of the invention.

A spacer 68 is located connected to the wire frame 12, such as, for example, by the wire extending through the spacer, in the rear cavity 46. In one embodiment, the spacer 68 has a bore 70 formed at a first end 72, which is configured to receive at least a portion of the spring 66, and a counterbore 74 extending from the bore 70 to the second end 76 of the spacer, through which the wire frame 12 extends.

As seen in FIG. 4, the spring 66 is positioned between the wall 42 of the housing 32 and the spacer 68 and the spacer is positioned between the first end 16 of the wire frame 12 and the spring, at least partially in the rear cavity 46. The spacer 68 may be held in position by the end of the first end 16 of the wire frame 12, e.g. the loop 18. Locating at least a portion of the resilient member 66 in the bore 70 of the spacer 68, keeps the spring centrally positioned around the wire frame 12 and urges the spring to compress straight without bowing and prevents the spring from contacting and, thereby, deteriorating the interior portion of the housing 32 forming the rear cavity 46 and impeding rotation of the body. The spacer 68 may be made of a variety of materials known in the industry, e.g. plastic, lead, etc., based upon the desired operation of the spacer. For example, in the embodiment seen in FIG. 2, the spacer 68 is made from a metal material, such as lead to weight the bait 10. The location of the weight, for example, through the use of metal spacers, can help the bait 10 get to a desired depth in the water where the target fish are located. The location of weight, such as towards the back end of the bait 10, can also help promote the bait to be properly oriented when being retrieved by a fisherman or woman.

The spacer 68 may be held centrally positioned around the wire frame 12 as well. In the embodiment seen in FIG. 4, the second end 76 of the spacer 68 has a blind bore, concavity or impression 78. A rear centering structure 80 connected to the wire frame 12 is position between the spacer 68 and the end of the first end 16 of the wire frame 12, e.g. the loop 18. In the embodiment seen in FIG. 3, the rear centering structure 80 is a bead. However, other centering structures are known in the industry, e.g. BBs, washers, conically shaped elements, the use of which would not defeat the spirit of the invention. The wire frame 12 extends through the rear bead 80 such that the rear bead can spin or rotate around the wire frame, but generally remains centered on the wire frame. When the rear bead 80 is located at least partially in the concavity 78, the spacer 68 is centered on the wire frame 12. The rear bead 80 may also help keep the rear of the capsule portion 38 of the housing 32 centered on the wire frame 12 and the rear of the capsule portion and spacer from binding on the loop 18 at the first end 16 of the wire 12.

The centering structure can be selected based on the characteristics desired for that location and for performance of the bait and/or the type of fish sought. Some characteristics include the color (e.g. an orange bead), the reflective properties (e.g. brass), weight (e.g. heavy lead) or material (e.g. corrosion resistant tungsten). In the embodiment seen in FIG. 3, the rear bead is a colored plastic bead.

Another centering structure connected to the wire frame 12, interior centering structure 82, can be used between the wall 42 and the spring 66 to keep the front of the spring centered on the wire frame 12. In the embodiment seen in FIG. 4, the interior centering structure 82 is a metal material, such as brass, BB. The material used for this interior centering structure 82 can be determined based upon weight positioning of the bait 10 as discussed above.

Alternatively, or in addition, a second locator connected to the frame 12, could be used between the clevis 30 and the loop 26 at the second end 24 of the wire frame 12 to prevent the clevis from binding on the loop. In the embodiment seen in FIG. 1, the second locator is a white plastic bead.

As the bait 10 is retrieved in the water, e.g. by reeling, the water will cause the blade 28 to spin causing the clevis 30 to rotate around the wire frame 12. As the clevis 30 spins or rotates, it will contact the cam 36 of the housing 32. The contact and resulting impact will push or move the housing 32 backwards away from the front of the bait 10, causing the spring 66 to compress between the wall 42 of the housing 32 and the spacer 68 and cause the housing to rotate. The compression of the spring 66 permits the housing 32 to move away from the clevis 30, so the clevis can pass the cam 36 and continue to rotate.

Once the clevis 30 passes the cam 36, the spring 66 is free to decompress and urge the housing back towards the blade 28 and clevis 30 until the clevis rotates around again and contacts the cam again resulting in the action described above repeating. In some embodiments, the spring 66 may not fully decompress before the clevis 30 contacts the cam 36 again. The impact from the clevis 30 and the movement of the housing 32 along the wire frame 12 cause the ball(s) 34 to move around and contact each other, the portion of the housing 32 forming the front cavity 44 and the interior portion of the capsule portion 38. The impact also helps reduce the effects of, by disrupting, centrifugal force that acts on the ball(s) 34 which tends to urge them against the interior wall of the capsule portion 38. This contact results in noise and vibrations and can cause the bait 10 to have a more erratic action, e.g. pulsating and/or non-concentric orbital movement.

The front cavity 44 can be configured in any number of shapes known in the industry. However, if the shape of the front cavity 44 is spherical or cylindrical, the balls 34 will not contact the sides of the front cavity formed by the housing 32 as much. Further, if the shape of the front cavity 44 is square or triangular, the balls 34 may be more likely to get stuck in a corner. In the embodiment seen in FIG. 6, the front cavity 44 has a hexagonal shape, which promotes the balls 34 to contact the sides of the front cavity formed by the housing 32 and still continue to move around the front cavity without getting caught in a corner.

In FIGS. 7-11, another type of bait 10' is shown, e.g. a safety pin or overhead arm spinner bait. However, other baits could be used, including, for example, in-line spinners and tail-spinners, without defeating the spirit of the invention. In the embodiment seen in FIG. 7, the bait 10' includes a body 88 formed from, for example, lead. However, other materials for making an artificial bait are known in the industry and the use of which would not defeat the spirit of the invention. A hook 14 is attached to the body 88, such as by being integrally formed.

Figure 7:
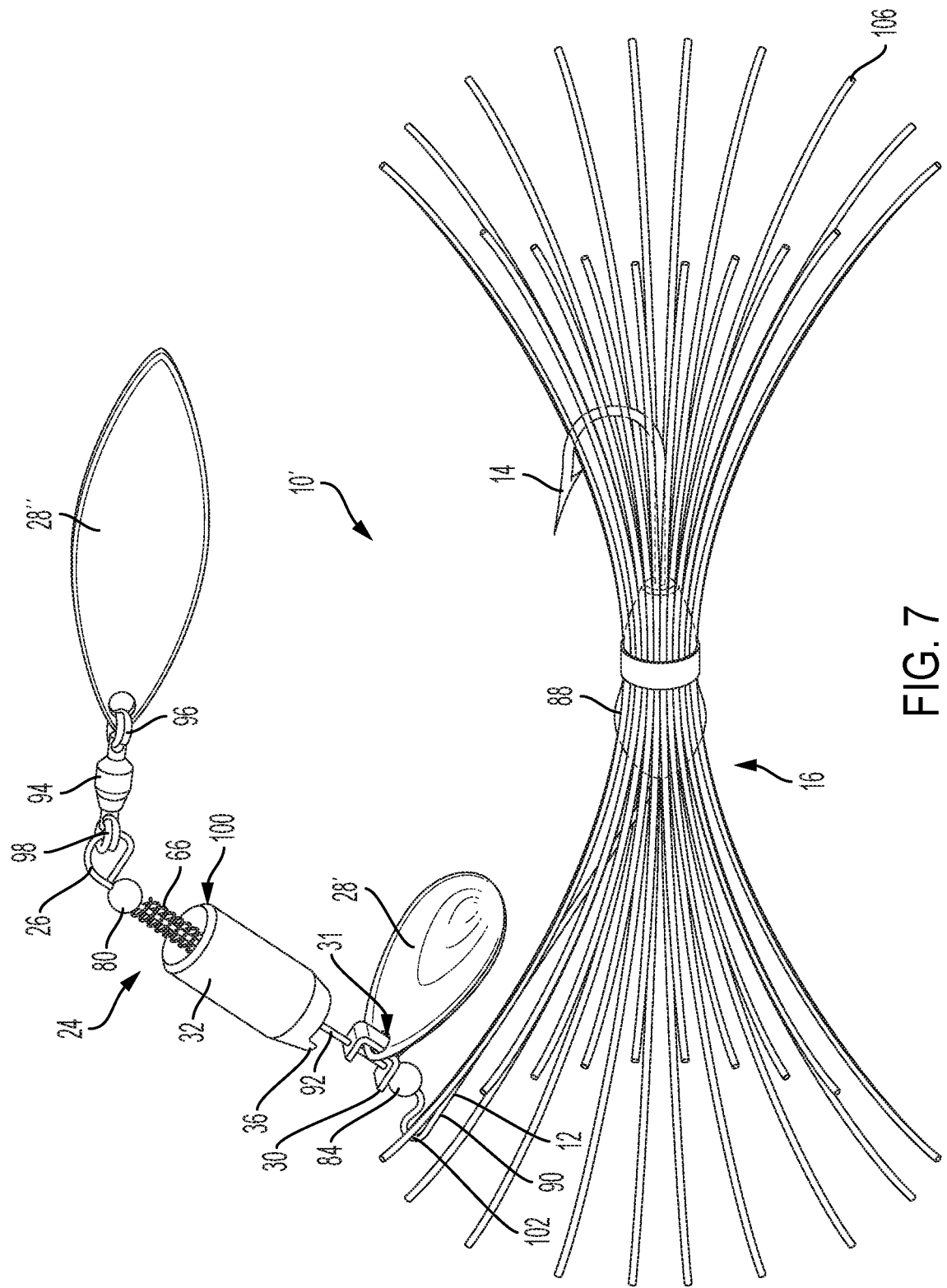
FIG. 7 is a side perspective view of another embodiment of a bait.
Figure 8:
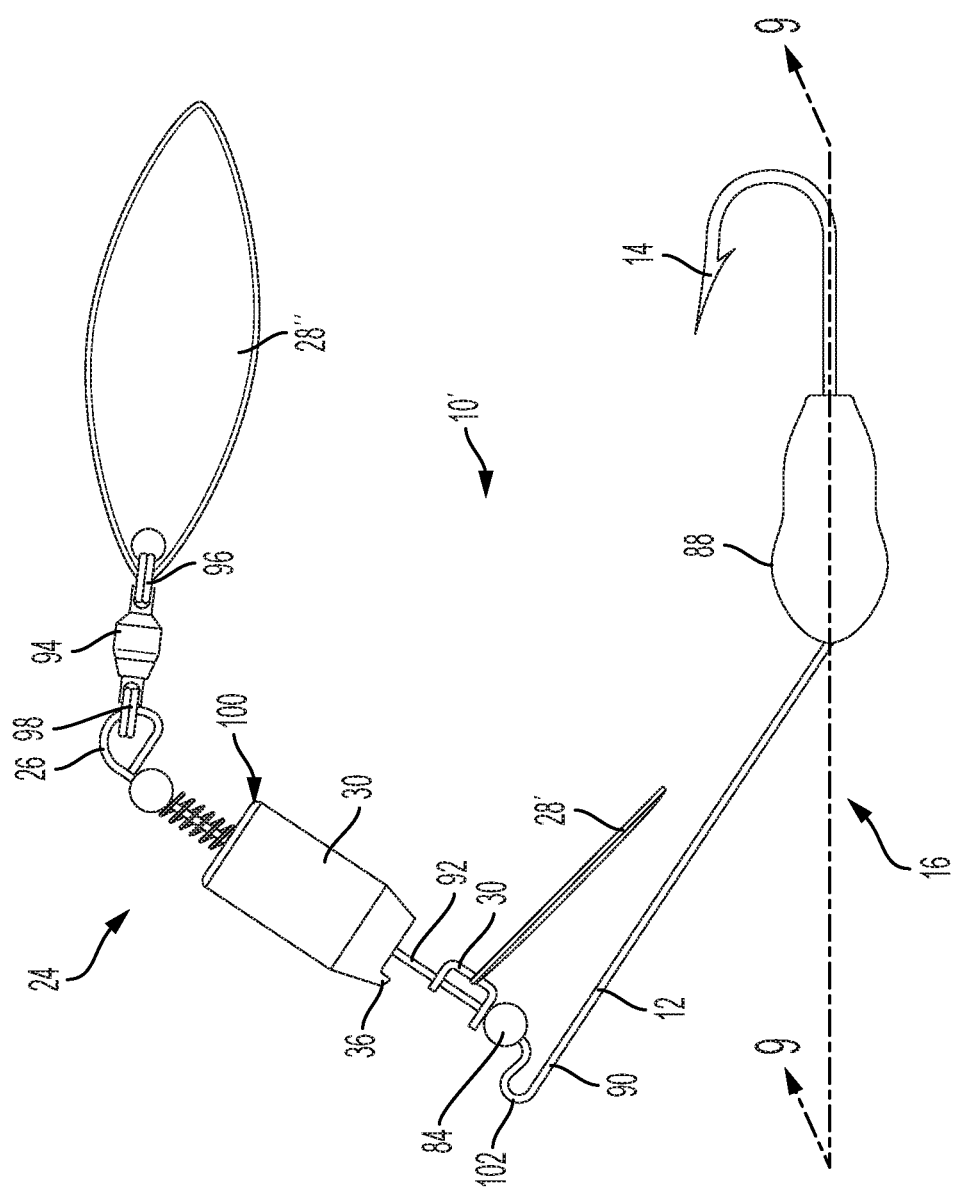
FIG. 8 is a side elevation view of the bait of FIG. 7 without a skirt.
Figure 9:
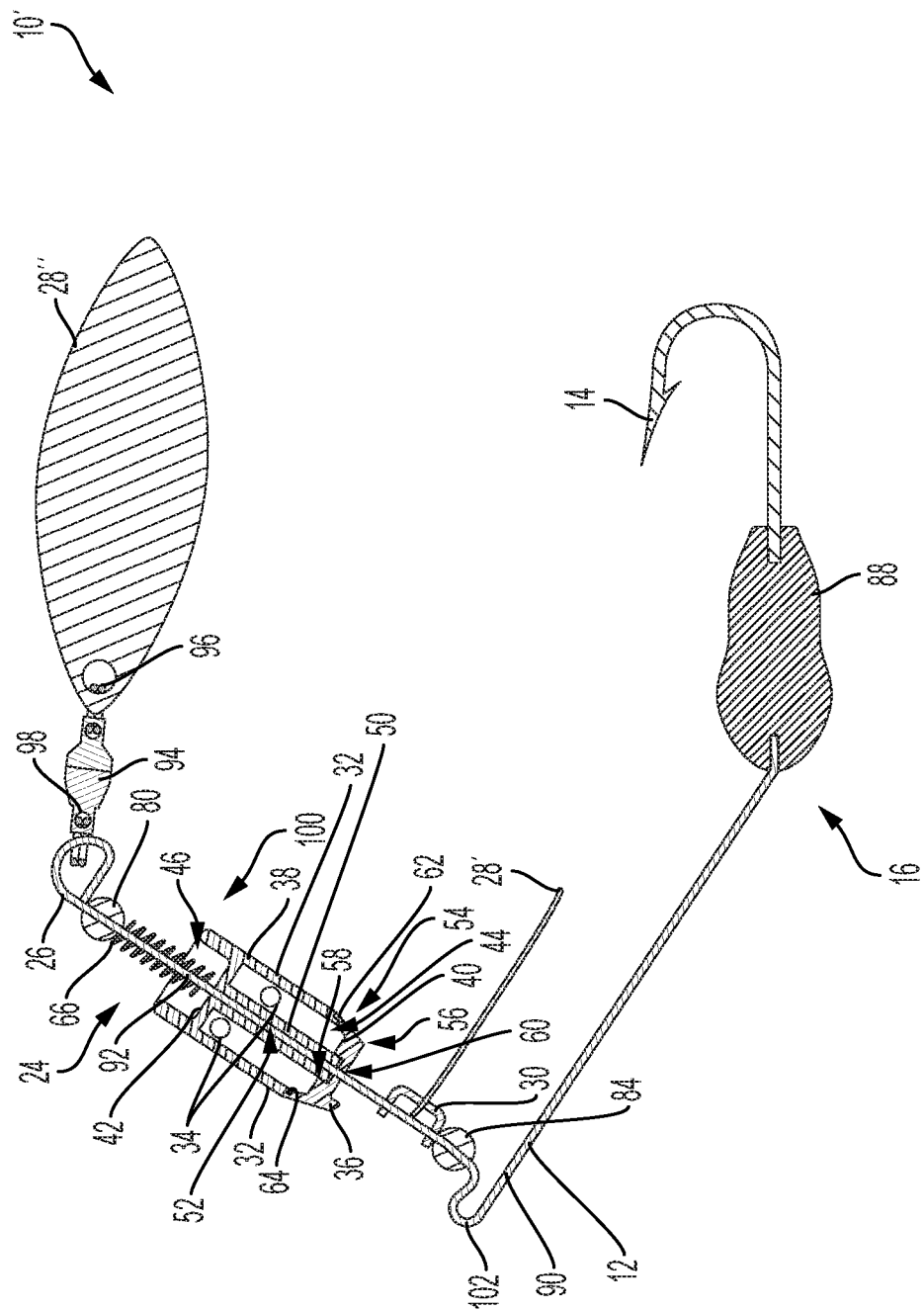
FIG. 9 is a side cross-sectional view of the bait in FIG. 8 taken from the line 9-9.

A wire frame 12 is connected or attached to a first side or front of the body 88. The wire frame shown in FIG. 7 has a first portion 90 directly attached to the body 88 and a second portion 92 that is angled roughly ninety degrees from the first portion. A hook 14 can be attached to the rear or second side of the body 88. A first blade 28' can be rotatably attached to the end of the second end 24, such as to a loop 26 formed in the second end. In the embodiment seen in FIG. 7, a fastener 94 attaches the first blade 28', which is similar to a willow leaf, to the loop 26. The fastener 94 in FIG. 7 is a swiveling connector with a first split ring 96 that attaches to a hole 31 formed in the first blade 28' and a second split ring 98 that attaches to the loop 18 and wherein the swiveling connector permits the first split ring to rotate independent of the second split ring to permit the first blade 28' to rotate more freely and at a variety of angles.

A second blade 28" is rotatably attached to the second portion 92 of the wire frame 12 by a clevis 30 as described with respect to the bait 10 above. In the embodiment seen in FIG. 7, the second blade 28" is similar to a Colorado blade. A housing 32 containing at least two balls 34 is attached to the second portion 92 of the wire frame 12 adjacent the second blade 28". In the embodiment seen in FIG. 11, the housing 32 includes a front cavity or chamber 44 and a rear cavity 46 separated by a wall 42. The balls 34 are located in the front cavity 44 and contained within the front cavity by a cap portion 40 as described above with respect to the bait 10. The rear cavity 46 is sized and shaped to at least partially receive the spring 66.

A rear centering structure 80 is positioned on the wire frame 12 between the rear end 100 of the housing 32 and the loop 18. In the embodiment seen in FIG. 10, the rear centering structure 80 is a metal BB sized to fit partially within the spring 66 to center the spring on the metal frame 12 and prevent the spring and housing from binding on the loop 18.

The intersection of the first portion 90 and the second portion 92 can include a partition 102 to prevent the clevis 30, blade 28, and housing 32 on the second portion from moving onto the first portion. In the embodiment seen in FIG. 8, the partition 102 is an extra bend. However, other partitions are known in the industry, including a loop, a thickened portion, etc., the use of which would not defeat the spirit of the invention. A forward centering structure 84 is positioned on the wire frame 12 between the clevis 30 and the partition 102 to prevent the clevis 30 from binding on the partition.

As the second blade 28" spins, the clevis 30 spins. The spinning clevis 30 will contact the cam 36 on the cap portion 40 of the housing 32 similar to that as described above with respect to the bait 10.

Other accessories can be attached to the bait without defeating the spirit of the invention. For example, the spinner bait 10, may include a feather skirt 104 attached to the hook 14 to disguise the hook and attract fish. By way of another example, the safety spin spinner bait 10' may include plastic skirt 106 which includes a number of color plastic threads attached to the body 88, such as by a rubber band or zip tie.

Figure 10:
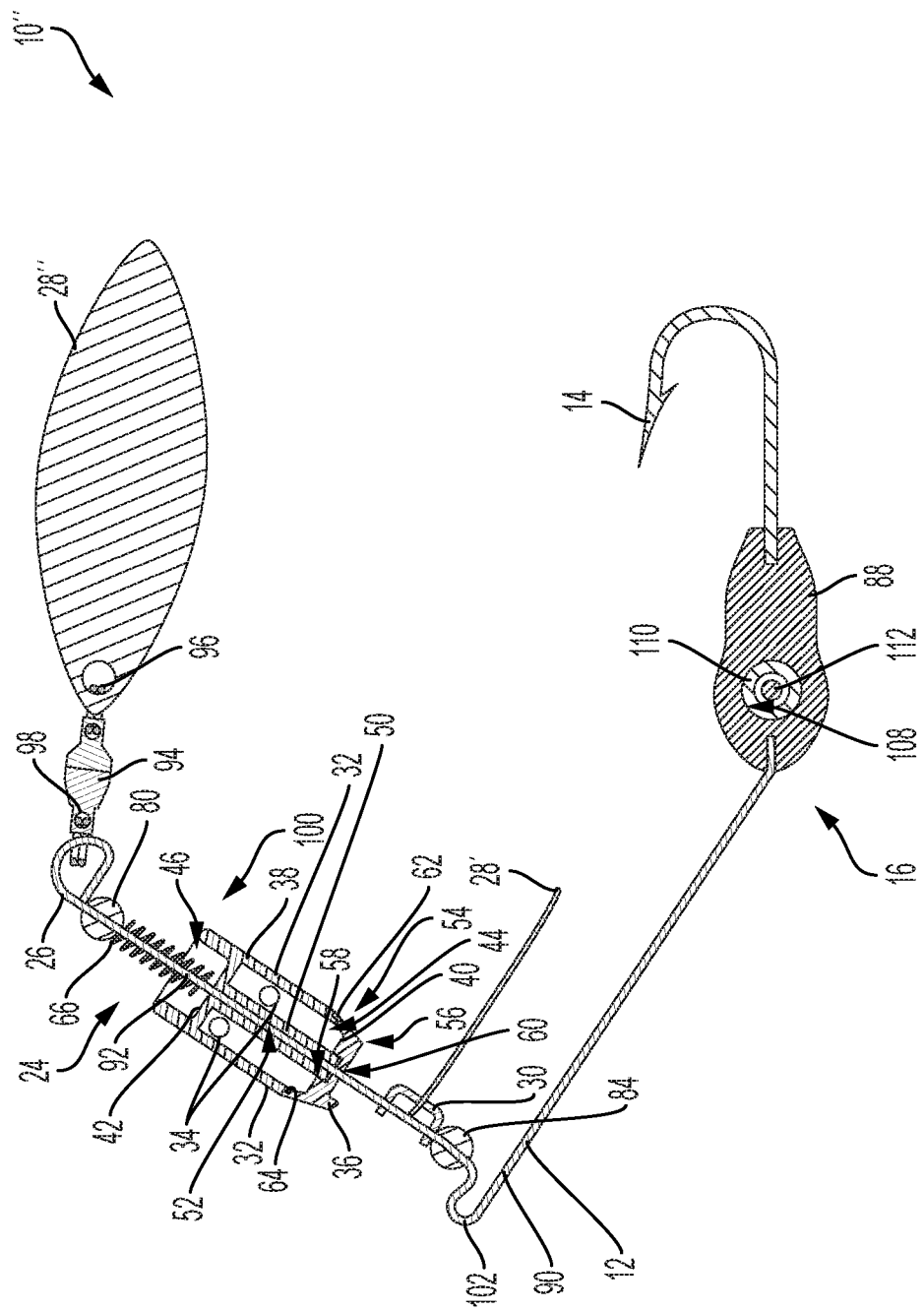
FIG. 10 is a side cross-sectional view of an alternative embodiment of the bait in FIG. 9.

As discussed above, one embodiment includes a moving eye such as that taught in U.S. Pat. Nos. 10,575,506 and 10,244,741. The body 88 as seen in FIG. 10 has a hole or bore 108 formed therein in the general location of where an eye would be of the live bait which the artificial bait 10" is attempting to mimic. A tube 110 is located or positioned in the hole 108. The tube 110 may extend and be visible from a first side of the body 88 to, and be visible from, the second side of the body. The tube 110 can include one or more noise making elements 112, e.g. balls or ball bearings, located in the tube that make a noise and vibration when they contact each other and/or the tube. The tube 110 may be made from a material that permits light through the material such that at least one ball 112 is visible through the tube when the at least one ball is located near one of the first end and second ends of the tube. In one embodiment, the tube 110 is fixed in the hole 108 such as by epoxying, gluing, ultra or sonic binding, friction, welding, snap-fit, etc., the use of which would not defeat the spirit of the invention.

In some embodiments it is desired to coat the bait with a paint, epoxy, enamel or other coating. For example, if a lead material is used for the body 88, it may be desirable to coat the body so that handling by a user would not result in lead poisoning. Coating the bait, or portions thereof, can also increase the strength and longevity of the bait. Further, some fish can see and are attracted to colors more than others. Paint and/or epoxy could be applied to the bait in a number of known techniques, e.g. spray coating, and the number of applications could be varied depending on the desired finish and material used without defeating the spirit of the invention.

Although the invention has been herein described in what is perceived to be the most practical and preferred embodiments, it is to be understood that the invention is not intended to be limited to the specific embodiments set forth above. Rather, it is recognized that modifications may be made by one of skill in the art of the invention without departing from the spirit or intent of the invention and, therefore, the invention is to be taken as including all reasonable equivalents to the subject matter of the appended claims and the description of the invention herein.

What is claimed is:
1. A bait comprising:
  a frame;
  a line tie connected to the frame;
  a blade connected to the frame and configured to rotate around the frame;
  a housing having a cavity formed therein, the housing connected to the frame;

a resilient member connected to the frame, the resilient member is configured to urge the housing towards the blade; and at least one noise making element located within the cavity;

wherein the housing is configured such that as the blade rotates around the frame, the blade will contact the housing causing the housing to move away from the blade;

wherein the housing is configured such that the at least one noise making element moves when the housing moves; and wherein the housing is configured such that the at least one noise making element makes noise and vibration when the at least one noise making element moves.

2. The bait of claim 1, wherein the blade is connected to the frame by a fastener;

wherein the fastener is configured to rotate around the frame with the blade; and wherein the housing moves when the fastener contacts the housing.

3. The bait of claim 2, wherein the housing has a projection and the fastener contacts the housing by contacting the projection.

4. The bait of claim 1, wherein the frame is a wire frame and the blade is connected to the wire frame between the line tie and the housing.

5. The bait of claim 1, further comprising a hook connected to the frame and a skirt attached to the hook.

6. The bait of claim 1, wherein the resilient member is configured such that when the housing moves, the resilient member is compressed.

7. The bait of claim 1, wherein the cavity is a front cavity; wherein the housing has a rear cavity formed therein; and wherein the resilient member is at least partially located in the rear cavity.

8. The bait of claim 7, wherein a cap portion is attached to the front cavity of the housing to enclose the front cavity and the at least one noise making element and wherein a wall is formed in the housing to separate the front cavity from the rear cavity.

9. The bait of claim 8, wherein the cap portion has a first hole and the wall has a second hole and the frame extends through the first and second holes.

10. The bait of claim 9, further comprising a centering structure connected to the frame and wherein the centering structure is positioned between the wall and the resilient member.

11. The bait of claim 8, further comprising a post located in the front cavity;

wherein a bore is formed in the cap portion; and wherein the bore is configured to receive an end of the post when the cap portion is attached to the housing.

12. The bait of claim 8, wherein the cap portion has a first lip formed around an open end of the cap portion and wherein the first lip is configured to receive a second lip formed around the front cavity of the housing.

13. The bait of claim 7, further comprising a spacer connected to the frame; and wherein the spacer is located between an end of the frame and the resilient member.

14. The bait of claim 13, wherein the spacer is at least partially located in the rear cavity of the housing.

15. The bait of claim 13, wherein the spacer has a first bore and wherein the first bore is configured to receive at least a part of the resilient member.

16. The bait of claim 15, further comprising a centering structure connected to the frame;

wherein the spacer has a second bore; and wherein the second bore is configured to receive at least a portion of the centering structure.

* * * * *